(12) United States Patent
Fujisawa

(10) Patent No.: US 10,309,674 B2
(45) Date of Patent: Jun. 4, 2019

(54) AIR-CONDITIONING CONTROL SYSTEM, AIR-CONDITIONING CONTROL APPARATUS, AND AIR-CONDITIONING CONTROL METHOD

(71) Applicant: KYOCERA Corporation, Kyoto-shi, Kyoto (JP)

(72) Inventor: Ryuta Fujisawa, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/546,915

(22) PCT Filed: Jan. 27, 2016

(86) PCT No.: PCT/JP2016/000412
§ 371 (c)(1),
(2) Date: Jul. 27, 2017

(87) PCT Pub. No.: WO2016/121390
PCT Pub. Date: Aug. 4, 2016

(65) Prior Publication Data
US 2018/0031259 A1   Feb. 1, 2018

(30) Foreign Application Priority Data
Jan. 28, 2015  (JP) ................. 2015-014100

(51) Int. Cl.
*F24F 11/30* (2018.01)
*F24F 11/56* (2018.01)
(Continued)

(52) U.S. Cl.
CPC .............. *F24F 11/30* (2018.01); *F24F 11/56* (2018.01); *F24F 11/62* (2018.01); *F24F 11/89* (2018.01);
(Continued)

(58) Field of Classification Search
None
See application file for complete search history.

(56) References Cited

U.S. PATENT DOCUMENTS

| 2013/0145610 | A1  | 6/2013  | Feri et al. |
| 2014/0379298 | A1* | 12/2014 | Gilbert ................. G01K 17/06 702/182 |

(Continued)

FOREIGN PATENT DOCUMENTS

| JP | 2009-92267 A  | 4/2009 |
| JP | 2013-535007 A | 9/2013 |
| JP | 2014-134917 A | 7/2014 |

OTHER PUBLICATIONS

International Search Report dated Apr. 26, 2016, issued by Japan Patent Office for International Application No. PCT/JP2016/000412.
(Continued)

*Primary Examiner* — Ryan A Jarrett
(74) *Attorney, Agent, or Firm* — Procopio Cory Hargreaves and Savitch LLP

(57) ABSTRACT

An air-conditioning control apparatus is configured to group a plurality of environmental sensors into a plurality of groups, based on correlation coefficients between environmental information acquired by the plurality of environmental sensors. The air-conditioning control apparatus is configured to regularly calculate a correlation coefficient between environmental information acquired by one or more environmental sensors in each of the plurality of groups. The air-conditioning control apparatus is configured to reset, in the case where the calculated correlation coefficient is less than a predetermined value, a group associated with an environmental sensor. The air-conditioning control apparatus is configured to control each of a plurality of air conditioners that are each associated with any of the plu-
(Continued)

rality of groups, based on environmental information acquired by each environmental sensor in the group associated with the air conditioner.

11 Claims, 10 Drawing Sheets

(51) Int. Cl.
    *F24F 11/62*     (2018.01)
    *F24F 11/63*     (2018.01)
    *F24F 11/89*     (2018.01)
    *G05B 13/02*     (2006.01)
    *F24F 110/10*     (2018.01)

(52) U.S. Cl.
    CPC ............ *G05B 13/021* (2013.01); *F24F 11/63* (2018.01); *F24F 2110/10* (2018.01)

(56) References Cited

U.S. PATENT DOCUMENTS

2015/0358176 A1    12/2015   Hibara et al.
2017/0051937 A1*   2/2017   Toyoshima .............. F24F 11/30

OTHER PUBLICATIONS

Written Opinion dated Apr. 26, 2016, issued by Japan Patent Office for International Application No. PCT/JP2016/000412.

* cited by examiner

FIG. 5

| TEMPERATURE SENSOR | GROUP |
|---|---|
| 2a | G1 |
| 2b | G2 |
| 2c | G3 |
| 2d | G1 |
| 2e | G2 |
| 2f | G3 |

FIG. 6

| AIR CONDITIONER | GROUP |
|---|---|
| 3a | G1 |
| 3b | G2 |
| 3c | G3 |
| 3d | G1 |
| 3e | G2 |
| 3f | G3 |

FIG. 8

| TEMPERATURE SENSOR | GROUP |
|---|---|
| 2a | G1 |
| 2b | G2 |
| 2c | G3 |
| 2d | G1 |
| 2e | G1 |
| 2f | G3 |

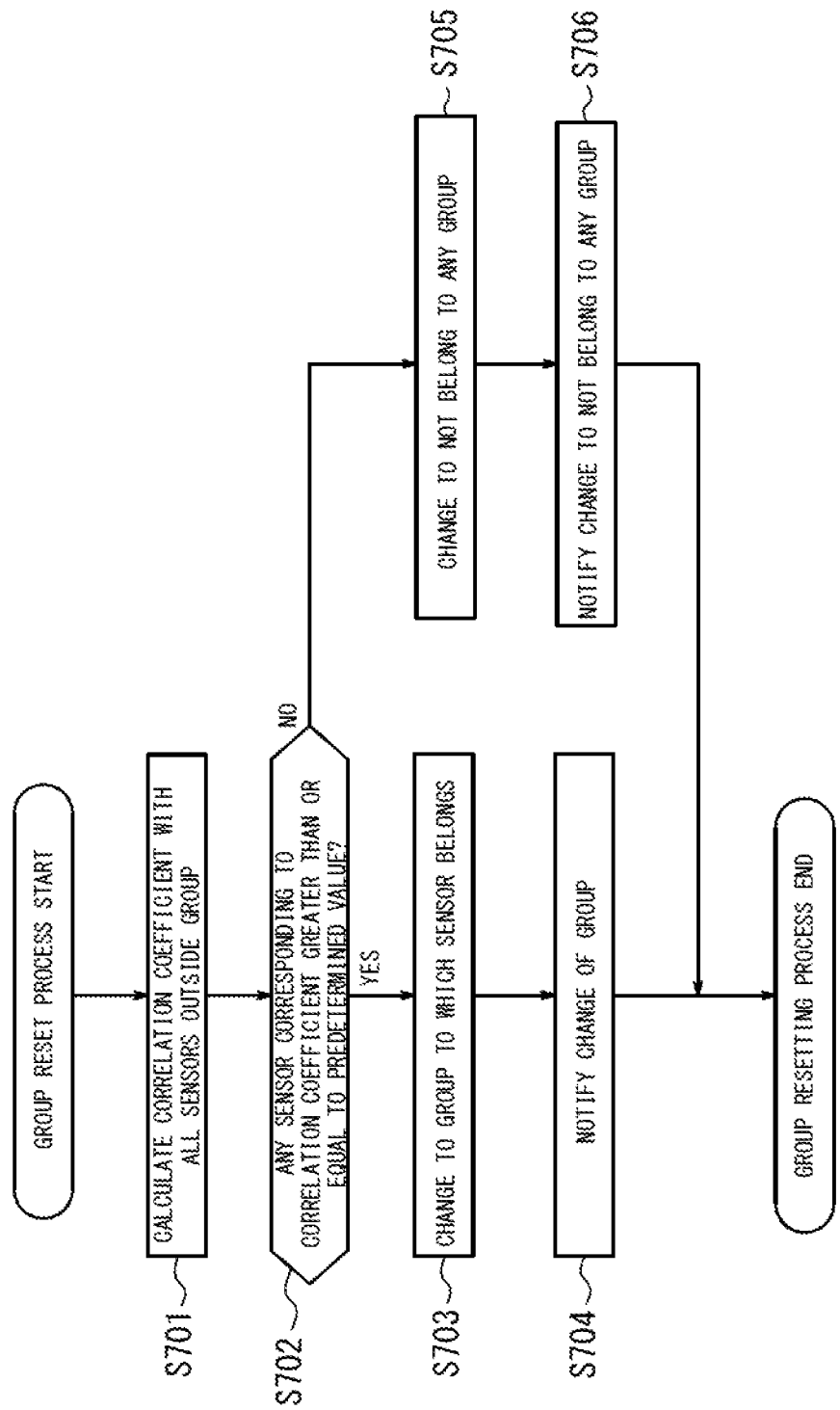

AIR-CONDITIONING CONTROL SYSTEM, AIR-CONDITIONING CONTROL APPARATUS, AND AIR-CONDITIONING CONTROL METHOD

CROSS REFERENCE TO RELATED APPLICATION

This application claims priority to and the benefit of Japanese Patent Application No. 2015-014100 (filed on Jan. 28, 2015), the entire disclosure of which is incorporated herein by reference.

TECHNICAL FIELD

The disclosure relates to an air-conditioning control method, air-conditioning control system, and air-conditioning control apparatus for stores, buildings, factories, and the like.

BACKGROUND

Conventional air-conditioning control in a store involves measuring environmental information (e.g., temperature) in the store by environmental sensors (e.g., temperature sensors) and controlling air conditioners based on the measured environmental information. In the case of measuring environmental information in a store or a building, environmental sensors are mounted on shelves or equipment in the store to acquire environmental information close to that experienced by a body (e.g., a temperature that would be experienced by a body). A conventional technique uses environmental sensors that are capable of wireless communication and can be placed anywhere.

An air-conditioning control system according to an aspect of the disclosure is an air-conditioning control system provided in an area and comprising an air-conditioning control apparatus configured to control a plurality of environmental sensors which acquire environmental information in the area and a plurality of air conditioners which air-condition the area, wherein the air-conditioning control apparatus is configured to: group the plurality of environmental sensors into a plurality of groups, based on correlation coefficients between environmental information acquired by the plurality of environmental sensors; regularly calculate a correlation coefficient between environmental information acquired by one or more environmental sensors in each of the plurality of groups; reset, in the case where the calculated correlation coefficient does not exceed a first threshold, a group associated with the one or more environmental sensors; and control an air conditioner in the plurality of air conditioners that is associated with any of the plurality of groups, based on environmental information acquired by each environmental sensor in the group associated with the air conditioner.

An air-conditioning control apparatus according to an aspect of the disclosure is an air-conditioning control apparatus provided in an area to control a plurality of environmental sensors which acquire environmental information in the area and a plurality of air conditioners which air-condition the area based on the environmental information acquired by the plurality of environmental sensors, the air-conditioning control apparatus comprising: a group generator configured to group the plurality of environmental sensors into a plurality of groups, based on correlation coefficients between environmental information acquired by the plurality of environmental sensors; a correlation coefficient calculator configured to regularly calculate a correlation coefficient between environmental information acquired by one or more environmental sensors in each of the plurality of groups; a group reset unit configured to reset, in the case where the calculated correlation coefficient does not exceed a first threshold, a group associated with an environmental sensor; and an air conditioner controller configured to control an air conditioner in the plurality of air conditioners that is associated with any of the plurality of groups, based on environmental information acquired by each environmental sensor in the group associated with the air conditioner.

An air-conditioning control method according to an aspect of the disclosure is an air-conditioning control method used in an area to control a plurality of environmental sensors which acquire environmental information in the area and a plurality of air conditioners which air-condition the area, the air-conditioning control method including: grouping the plurality of environmental sensors into a plurality of groups, based on correlation coefficients between environmental information acquired by the plurality of environmental sensors; regularly calculating a correlation coefficient between environmental information acquired by one or more environmental sensors in each of the plurality of groups; resetting, in the case where the calculated correlation coefficient does not exceed a first threshold, a group associated with an environmental sensor; and controlling an air conditioner in the plurality of air conditioners that is associated with any of the plurality of groups, based on environmental information acquired by each environmental sensor in the group associated with the air conditioner.

BRIEF DESCRIPTION OF THE DRAWINGS

In the accompanying drawings:

FIG. 5 is a diagram illustrating an example of a temperature sensor table indicating groups to which temperature sensors belong;

FIG. 6 is a diagram illustrating an example of an air conditioner table indicating groups associated with air conditioners;

FIG. 8 is a diagram illustrating an example of a reset temperature sensor table in the case where a temperature sensor has been moved;

FIG. 11 is a flowchart illustrating operation relating to a group reset process.

DETAILED DESCRIPTION

In the case where a shelf or equipment is moved as a result of changing the layout in the store, an associated environmental sensor is also moved. In such a case, adaptive control of the air conditioners is desirable.

Accordingly, an aspect of the present disclosure provides an air-conditioning control system, air-conditioning control apparatus, and air-conditioning control method that can adaptively control air conditioners even in the case where an environmental sensor has been moved.

The following describes one of the disclosed embodiments.

Embodiment

Figure 1:
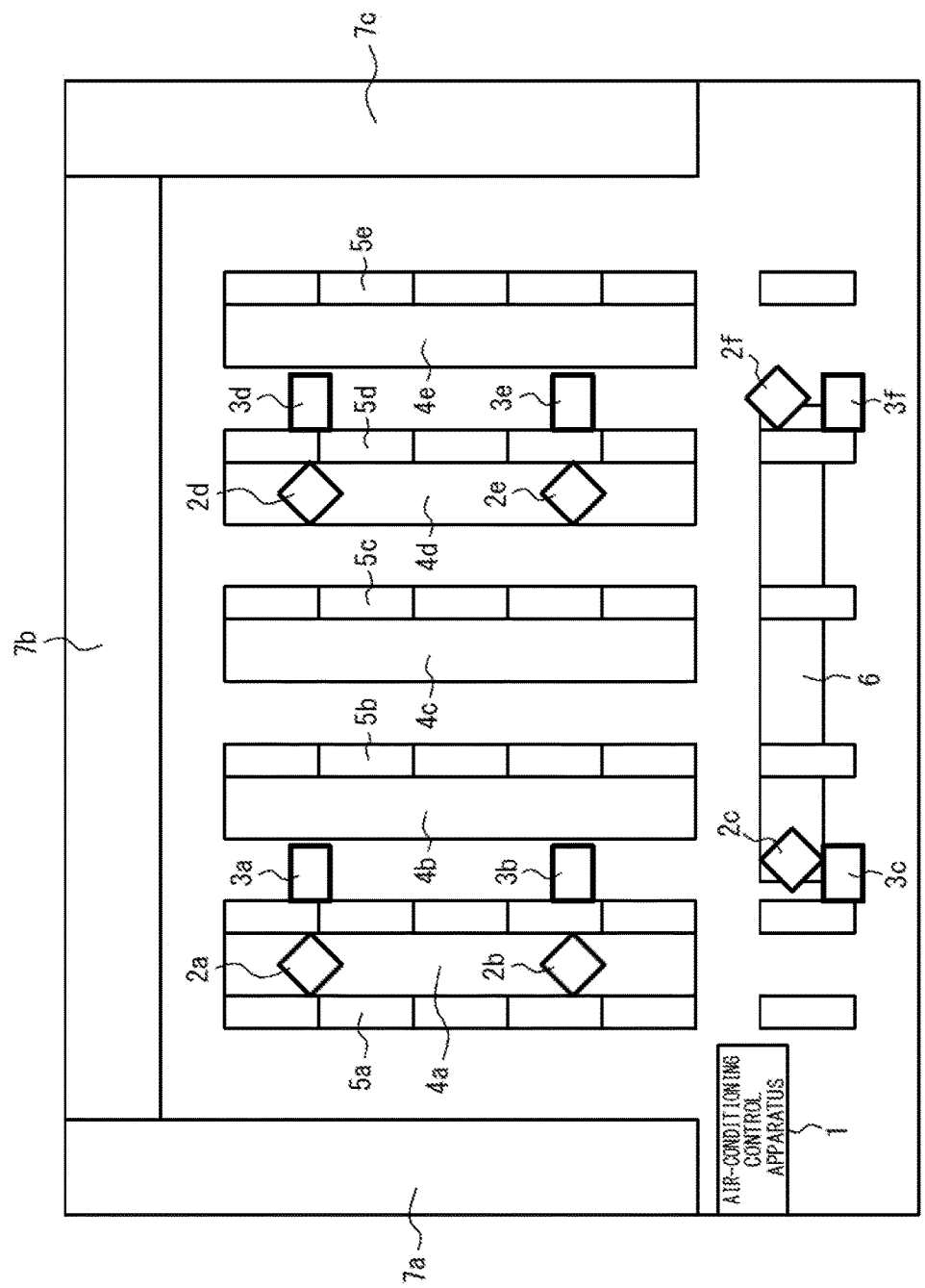
FIG. 1 is an overall schematic diagram of an air-conditioning control system according to one of the disclosed embodiments.

FIG. 1 is an overall schematic diagram of an air-conditioning control system according to an embodiment of the present disclosure. In brief, the air-conditioning control system according to this embodiment includes an air-conditioning control apparatus 1, a plurality of temperature sensors 2a to 2f (environmental sensors 2a to 2f), and a plurality of air conditioners 3a to 3f. The air-conditioning control system is provided, for example, on a floor (hereafter also referred to as "area") of a store, factory, or office. FIG. 1 illustrates an example where the air-conditioning control system is provided in a store. Store shelves 4a to 4e, lightings 5a to 5e mounted on the store shelves 4a to 4e, a checkout counter 6, and showcases 7a to 7c are arranged in the area in FIG. 1. The plurality of temperature sensors 2a to 2f are mounted on the top of the store shelves 4a to 4e and the top of the checkout counter 6. The plurality of air conditioners 3a to 3f are mounted on the ceiling, and provide air-conditioning to the area based on environmental information acquired by the temperature sensors 2a to 2f. In this embodiment, the environmental sensors are temperature sensors, and the environmental information is temperature information. Although in the following example the environmental sensors are temperature sensors and the environmental information is temperature information, this is not a limitation.

Figure 2:
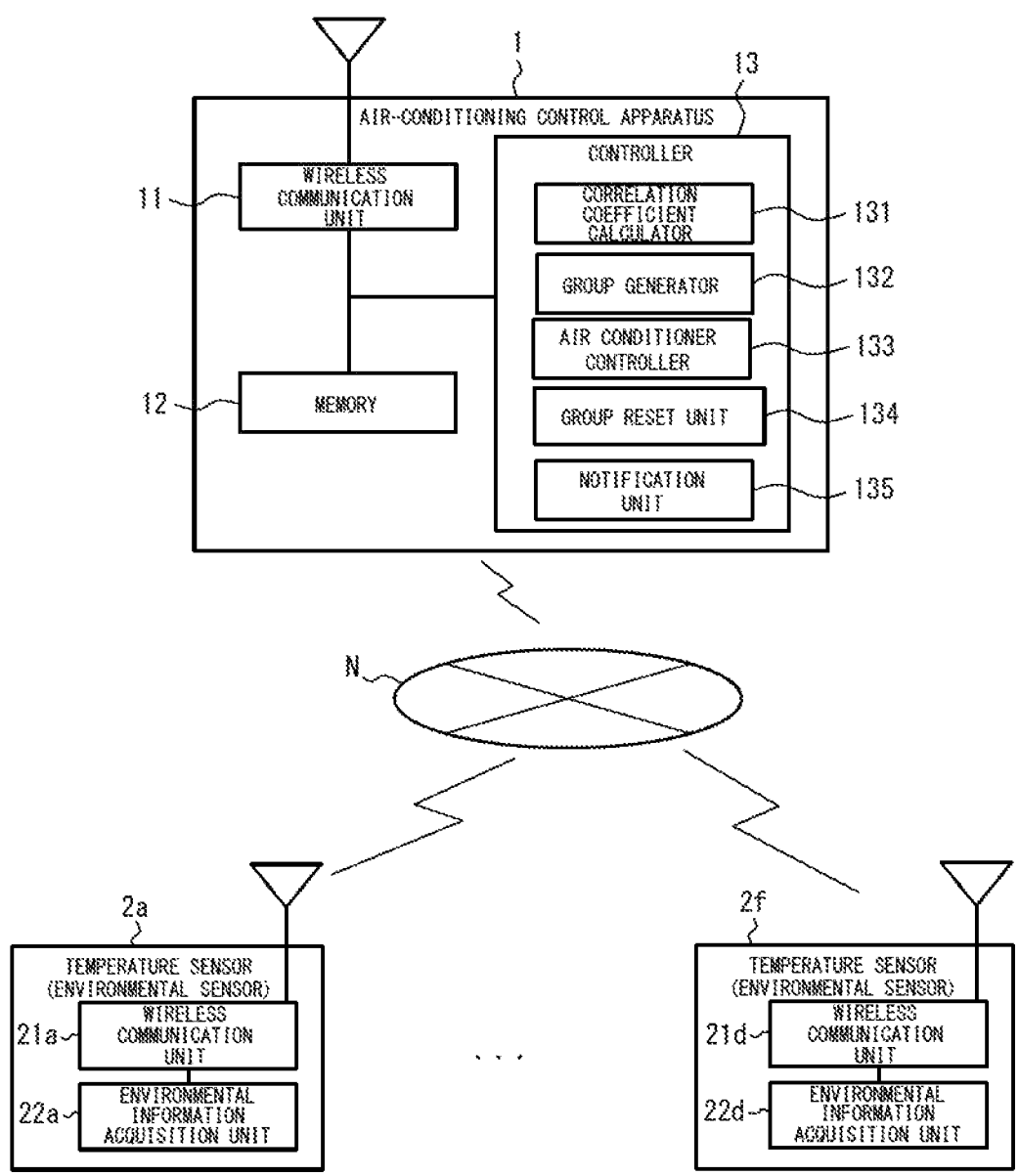
FIG. 2 is a block diagram of the air-conditioning control system according to the embodiment.

FIG. 2 is a block diagram of the air-conditioning control system according to an embodiment of the present disclosure. The air-conditioning control apparatus 1 includes a wireless communication unit 11, a memory 12, and a controller 13. The temperature sensor 2a includes a wireless communication unit 21a and an environmental information acquisition unit 22a. The wireless communication unit 21a communicates with the air-conditioning control apparatus 1 via a network N, to transmit temperature information acquired by the environmental information acquisition unit 22a. For example, the temperature information is data acquired by measuring temperature 100 times at intervals of 5 minutes during the store's daily operating hours (e.g., 10:00 a.m. to 8:00 p.m.). The temperature sensors 2b to 2f have the same structure as the temperature sensor 2a, and so their description is omitted.

The air-conditioning control apparatus 1 is described in detail below. The wireless communication unit 11 receives temperature information from the plurality of temperature sensors 2a to 2f via the network N. The wireless communication unit 11 also communicates with each of the air conditioners 3a to 3f via the network N, to transmit a control signal to each of the air conditioners 3a to 3f.

The memory 12 stores various information related to the air-conditioning control apparatus 1. In this embodiment, the plurality of temperature sensors 2a to 2f are organized in groups, as described later. Moreover, the air conditioners 3a to 3f are associated with these groups. The memory 12 stores a temperature sensor table indicating the groups to which the temperature sensors belong. The memory 12 also stores an air conditioner table indicating the groups associated with the air conditioners. These tables will be described later.

The controller 13 performs various controls related to the air-conditioning control apparatus 1. The controller 13 includes a correlation coefficient calculator 131, a group generator 132, an air conditioner controller 133, a group reset unit 134, and a notification unit 135.

The correlation coefficient calculator 131 calculates a correlation coefficient (hereafter also denoted by "α") between the temperature information received from the temperature sensors 2a to 2f. The correlation coefficient (α) is expressed by the following Formula (1):

$$\alpha = \frac{\sum_{i=1}^{n}(x_i - \bar{x})(y_i - \bar{y})}{\sqrt{\left\{\sum_{i=1}^{n}(x_i - \bar{x})^2\right\}\left\{\sum_{i=1}^{n}(y_i - \bar{y})^2\right\}}} \quad (1)$$

Here, the correlation coefficient calculator 131 calculates all correlation coefficients between the respective temperature information of the temperature sensors 2a to 2f. In detail, the correlation coefficient calculator 131 in this embodiment calculates a correlation coefficient between the temperature information of each of 15 different temperature sensor pairs, namely, the temperature sensors 2a and 2b, the temperature sensors 2a and 2c, the temperature sensors 2a and 2d, the temperature sensors 2a and 2e, the temperature sensors 2a and 2f, the temperature sensors 2b and 2c, . . . , and the temperature sensors 2e and 2f.

Figure 3A:
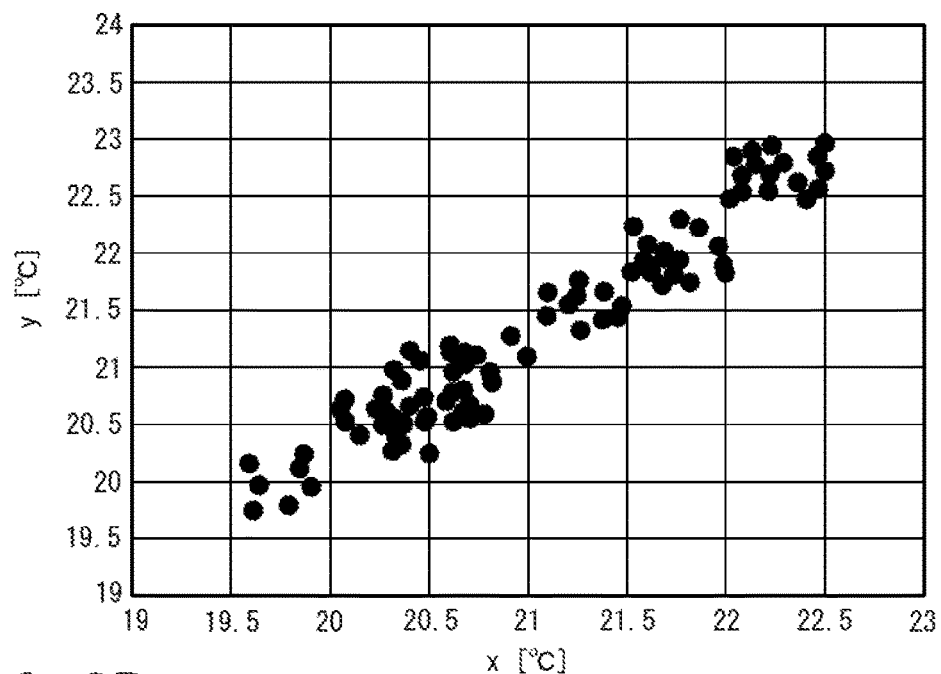
FIG. 3A is a graph illustrating the correlation between temperature information acquired by temperature sensors.
Figure 3B:
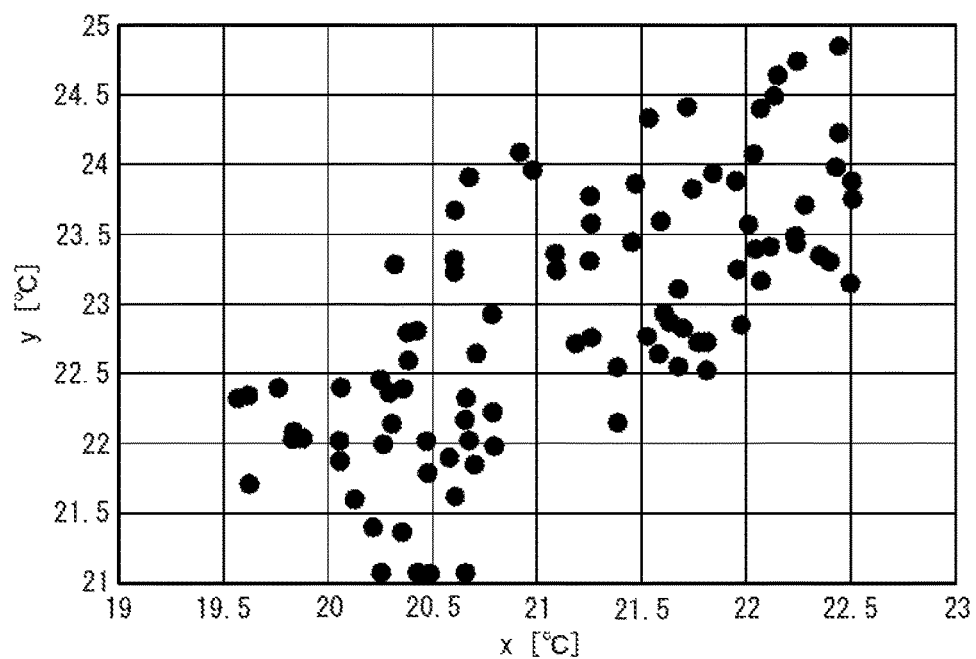
FIG. 3B is a graph illustrating the correlation between temperature information acquired by temperature sensors.

The group generator 132 groups the plurality of temperature sensors 2a to 2f into a plurality of groups, based on the correlation coefficients calculated by the correlation coefficient calculator 131. In detail, in the case where the correlation coefficient between the temperature information of temperature sensors is a predetermined value or more (e.g., 0.8 or more), the group generator 132 puts those temperature sensors into the same group. FIGS. 3A and 3B are graphs illustrating the correlation between temperature information acquired by temperature sensors. The coordinates of each plot are xi and yi. Each plot indicates the temperatures acquired by the temperature sensors at the same time. The horizontal axis represents the temperature acquired by one temperature sensor, and the vertical axis represents the temperature acquired by another temperature sensor. FIG. 3A is a graph indicating the correlation between temperature information acquired by temperature sensors in the same group. The correlation coefficient between the temperature information of the temperature sensors in FIG. 3A is 0.96. On the other hand, the correlation coefficient between the temperature information of the temperature sensors in FIG. 3B is 0.68. The temperature sensors having the correlation illustrated in FIG. 3B belong to different groups.

Figure 4:
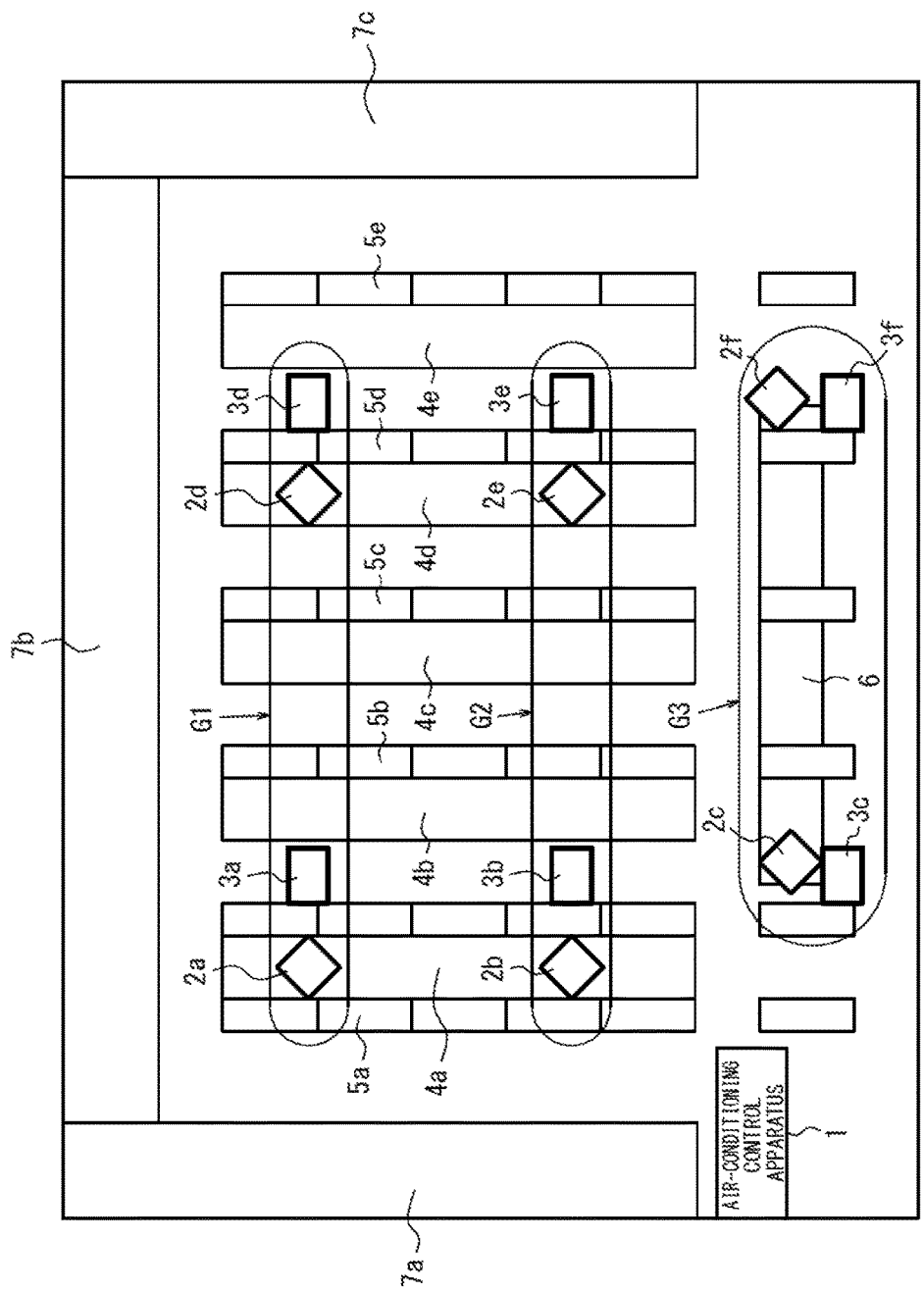
FIG. 4 is an overall schematic diagram illustrating groups to which temperature sensors belong.

FIG. 4 is an overall schematic diagram illustrating the groups to which the temperature sensors belong. The plurality of temperature sensors 2a to 2f are grouped into groups G1 to G3, based on the correlation coefficients. In the store illustrated in FIG. 4, the temperature sensors 2a and 2d located backmost in the store and near the showcase 7b belong to the same group G1. The temperature sensors 2c and 2f located on the checkout counter 6 belong to the same group G3. The temperature sensors 2b and 2e located between the groups G1 and G3 belong to the same group G2. This is because the average temperature and the temporal temperature change differ between the surroundings of the checkout counter 6 near the entrance and the surroundings of the showcase 7b away from the entrance.

The group generator 132 stores information about the generated groups in the memory 12, as the temperature sensor table. FIG. 5 is a diagram illustrating an example of the temperature sensor table indicating the groups to which the temperature sensors belong. The temperature sensor table associates temperature sensor identification information and group identification information with each other. The temperature sensor identification information is information for uniquely identifying a temperature sensor in the system. In this embodiment, 2a to 2f are respectively the temperature sensor identification information of the temperature sensors 2a to 2f. The group identification information is information for uniquely identifying a group in the system. In FIG. 5, G1 to G3 are group identification information. The temperature sensors 2a to 2f are each associated with any of the groups G1 to G3, as illustrated in FIG. 5.

The air conditioner controller 133 associates the plurality of groups and the air conditioners 3a to 3f with each other. In detail, the air conditioner controller 133 associates each air conditioner with any of the groups, based on the response time required for the temperature detected by each of the environmental sensors 2a to 2f to change by a predetermined temperature or more (e.g., 0.5° C. or more) in response to the operation of the air conditioner. In the example in FIG. 4, in the case where only the air conditioner 3a is operated to increase the temperature of the surroundings of the air conditioner 3a, the temperature sensor 2a responds fastest and the temperature detected by the temperature sensor 2a increases. In this case, the air conditioner controller 133 accordingly associates the air conditioner 3a with the group G1 to which the temperature sensor 2a belongs. In the example in FIG. 4, the air conditioners 3a and 3d are associated with the group G1. The air conditioners 3b and 3e are associated with the group G2. The air conditioners 3c and 3f are associated with the group G3. The association between the air conditioners and the groups is performed on the first day of installation of the system.

FIG. 6 is a diagram illustrating an example of the air conditioner table indicating the groups associated with the air conditioners 3a to 3f. The air conditioner table associates air conditioner identification information and group identification information. The air conditioner identification information is information for uniquely identifying an air conditioner in the system. In this embodiment, 3a to 3f are respectively the air conditioner identification information of the air conditioners 3a to 3f. The air conditioners 3a to 3f are each associated with any of the groups G1 to G3, as illustrated in FIG. 6.

The air conditioner controller 133 controls each air conditioner, based on the temperature information acquired by each temperature sensor in the group associated with the air conditioner. In detail, for example, the air conditioner controller 133 controls the air conditioning by the air conditioners 3a and 3d associated with the group G1, based on the temperature information of the temperature sensors 2a and 2d in the group G1. Thus, the air-conditioning control system according to this embodiment can adaptively control the air conditioners based on the temperature information acquired by the temperature sensors.

Once the group generator 132 has generated the groups, the correlation coefficient calculator 131 regularly (e.g., daily) receives the temperature information of that day from each temperature sensor, and calculates the correlation coefficient between the temperature information of the temperature sensors in each group. In other words, once the group generator 132 has generated the groups, the correlation coefficient calculator 131 calculates the correlation coefficient between the temperature information of the temperature sensors in the same group, based on the temperature sensor table stored in the memory 12. In detail, the correlation coefficient calculator 131 calculates a total of three correlation coefficients: the correlation coefficient between the temperature information of the temperature sensors 2a and 2d in the group G1, the correlation coefficient between the temperature information of the temperature sensors 2b and 2e in the group G2, and the correlation coefficient between the temperature information of the temperature sensors 2c and 2f in the group G3.

Figure 7:
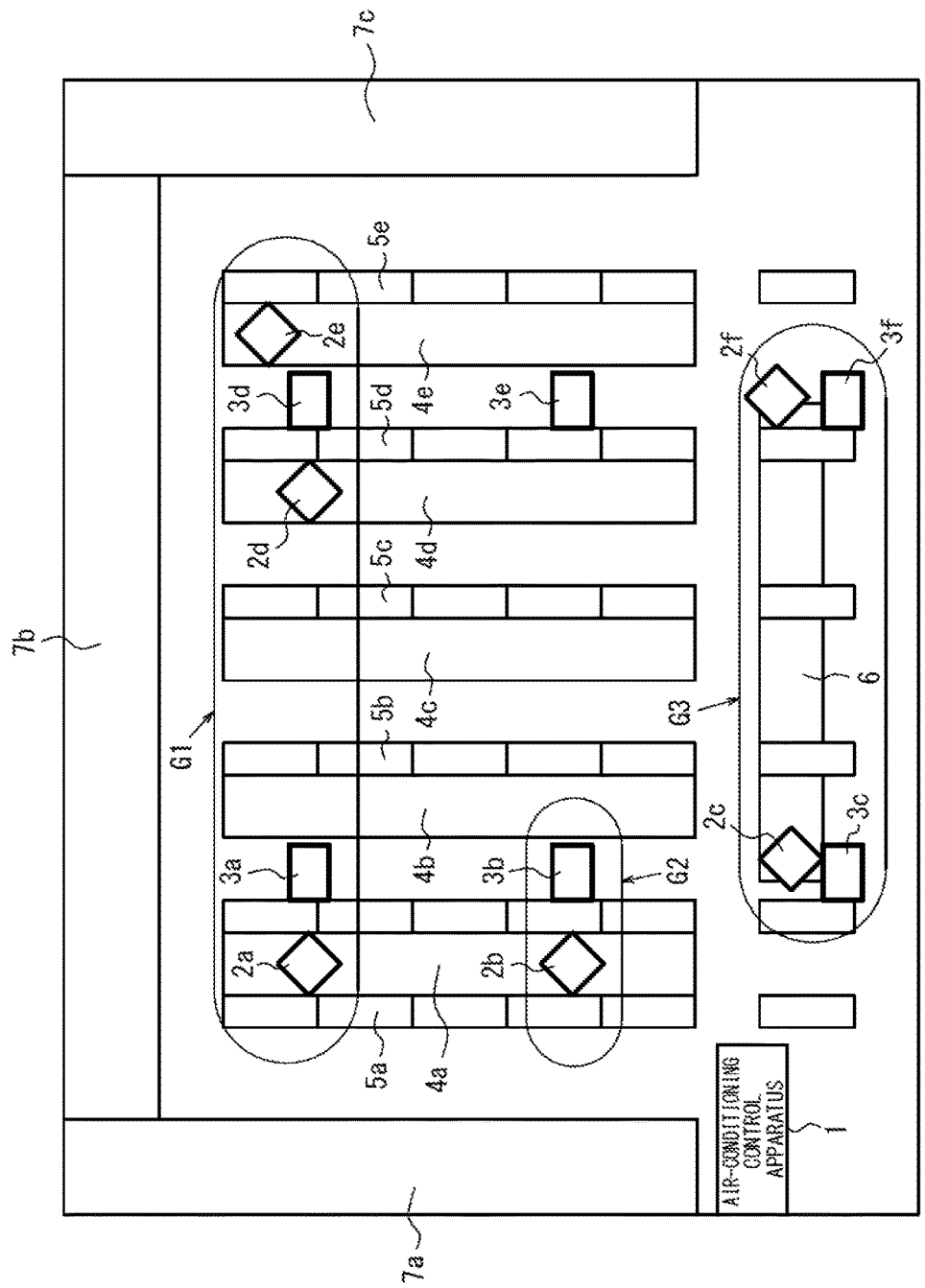
FIG. 7 is an overall schematic diagram illustrating groups to which temperature sensors belong in the case where a temperature sensor has been moved.

In the case where each correlation coefficient of temperature information regularly calculated by the correlation coefficient calculator 131 is a predetermined value or more (e.g., 0.8 or more), the controller 13 determines that a group reset is unnecessary. In the case where a correlation coefficient of temperature information regularly calculated by the correlation coefficient calculator 131 is less than the predetermined value, on the other hand, the controller 13 determines that a group reset is necessary. In the case where a correlation coefficient of temperature information regularly calculated by the correlation coefficient calculator 131 is less than the predetermined value, the group reset unit 134 resets the group associated with the temperature sensors. For example, in the case where the temperature sensor 2e has been moved from the store shelf 4d to the store shelf 4e as a result of a layout change as illustrated in FIG. 7, the correlation coefficient between the temperature sensors 2b and 2e decreases. The group associated with the temperature sensors is reset in such a case.

In detail, the group reset unit 134 calculates, for the temperature sensors (the temperature sensors 2b and 2e in the example in FIG. 7) whose correlation coefficient is less than the predetermined value, the correlation coefficient between the temperature sensor and each of the other temperature sensors including the temperature sensors of the other groups (the groups G1 and G3 in the example in FIG. 7), using the correlation coefficient calculator 131. If there is a combination whose correlation coefficient is the predetermined value or more, the group reset unit 134 changes the temperature sensor to the same group as the group to which the other temperature sensor in the combination whose correlation coefficient is the predetermined value or more belongs. In the example in FIG. 7, the correlation coefficient between the temperature information of the temperature sensors 2e and 2a (or the temperature sensors 2e and 2d) is the predetermined value or more. The group reset unit 134 accordingly changes the temperature sensor 2e to the group G1 to which the temperature sensor 2a belongs. The group reset unit 134 updates the temperature sensor table in the memory 12. FIG. 8 illustrates an example of the updated temperature sensor table. The group to which the temperature sensor 2e belongs has been changed from the group G2 to the group G1, as illustrated in FIG. 8.

If there is no combination whose correlation coefficient is the predetermined value or more, the group reset unit 134 changes the temperature sensor such that it no longer belongs to any group. For example in the case where the temperature sensor 2e has been moved to another area such as outside the store, there will be no combination whose correlation coefficient is the predetermined value or more.

In the case where the group to which a temperature sensor belongs has been changed or the temperature sensor has been changed such that it no longer belongs to any group, the notification unit 135 notifies an administrator accordingly. For example, the notification unit 135 transmits an email to the administrator through the wireless communication unit 11. Alternatively, in the case where the air-conditioning control apparatus 1 includes an interface such as a display, the notification unit 135 may display the change of the group or the like on the display to notify the administrator. In the example in FIG. 7, the notification unit 135 notifies, through the wireless communication unit 11, the administrator that the group to which the temperature sensor 2e belongs has been changed from the group G2 to the group G1, by email or the like.

Figure 9:
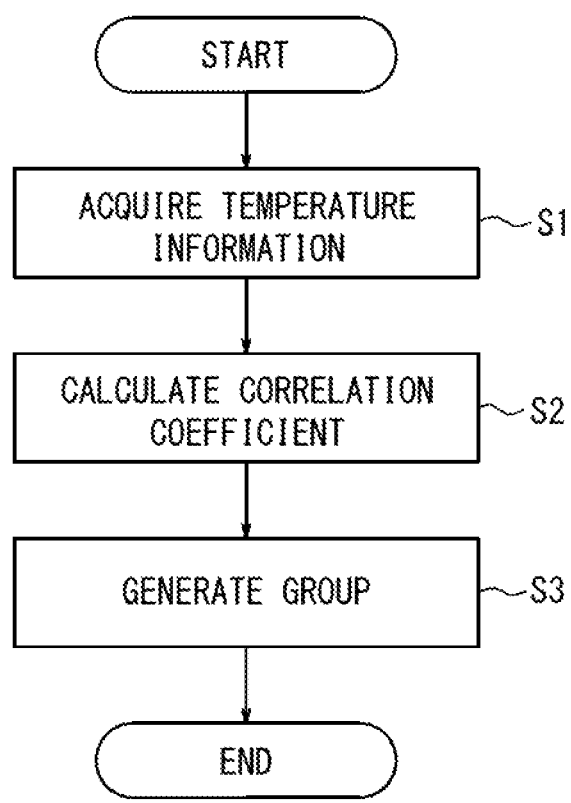
FIG. 9 is a flowchart illustrating the initial operation of the air-conditioning control system according to the embodiment.
Figure 10:
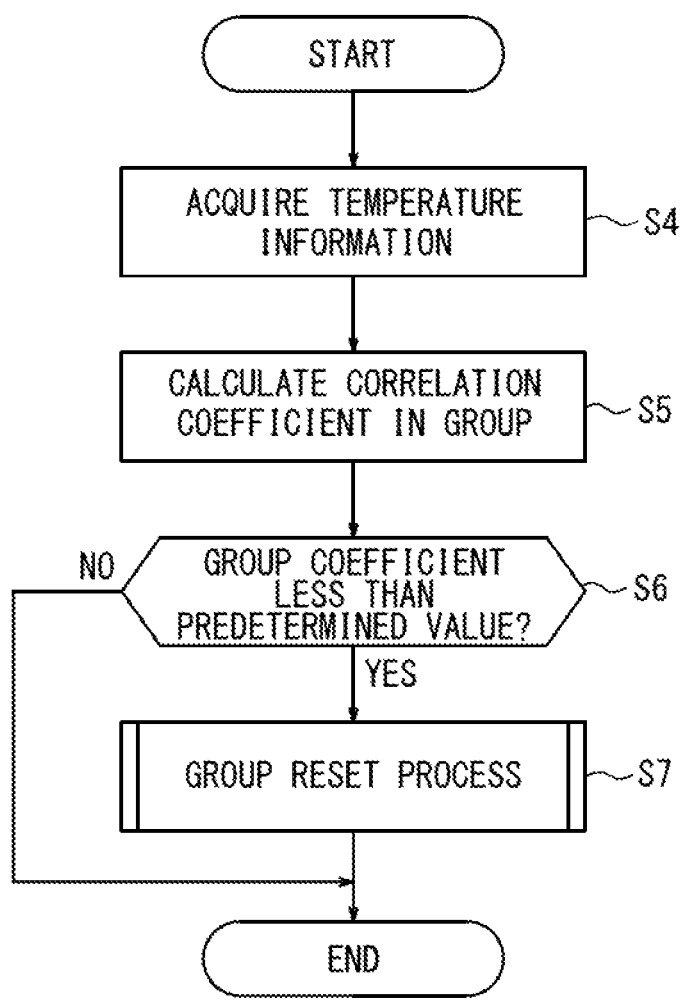
FIG. 10 is a flowchart illustrating the regular operation of the air-conditioning control system according to the embodiment.

Next, operation of the air-conditioning control system according to this embodiment will be described with reference to flowcharts in FIGS. 9 to 11. FIG. 9 illustrates initial operation. FIG. 10 illustrates regular operation after the initial operation. FIG. 11 illustrates operation relating to a group reset process. First, the initial operation will be described. The initial operation is performed, for example, on the first day of installation of the air-conditioning control system.

(Initial Operation)

The initial operation illustrated in FIG. 9 is described first. First, each of the environmental information acquisition units 22a to 22f of the plurality of temperature sensors 2a to 2f acquires temperature information of the surroundings on the first day. For example, each of the environmental information acquisition units 22a to 22f acquire data by measuring temperature 100 times at intervals of 5 minutes during the store's operating hours of the first day, as the temperature information. Each of the wireless communication units 21a to 21f communicates with the air-conditioning control apparatus 1 via the network N, to transmit the temperature information acquired by the environmental information acquisition units 22a. The wireless communication unit 11 in the air-conditioning control apparatus 1 receives the temperature information from each of the plurality of temperature sensors 2a to 2f via the network N (step S1).

Next, the correlation coefficient calculator 131 in the air-conditioning control apparatus 1 calculates the correlation coefficients between the received temperature information (step S2). The correlation coefficient calculator 131 calculates all correlation coefficients between the temperature information of the temperature sensors 2a to 2f.

Following this, the group generator 132 groups the plurality of temperature sensors 2a to 2f into a plurality of groups, based on the correlation coefficients calculated by the correlation coefficient calculator 131 (step S3). The group generator 132 stores information about the generated groups in the memory 12, as the temperature sensor table. This completes the initial operation.

(Regular Operation)

The regular operation illustrated in FIG. 10 is described next. The regular operation illustrated in FIG. 10 is performed, for example, on a daily basis after the initial operation. First, each of the environmental information acquisition units 22a to 22f of the plurality of temperature sensors 2a to 2f acquires the temperature information of the surroundings on the day. For example, each of the environmental information acquisition units 22a to 22f acquires data by measuring temperature 100 times at intervals of 5 minutes during the store's operating hours of the day, as the temperature information. Each of the wireless communication units 21a to 21f communicates with the air-conditioning control apparatus 1 via the network N, to transmit the temperature information acquired by the environmental information acquisition unit 22a. The wireless communication unit 11 in the air-conditioning control apparatus 1 receives the temperature information from each of the plurality of temperature sensors 2a to 2f via the network N (step S4).

Next, the correlation coefficient calculator 131 in the air-conditioning control apparatus 1 calculates the correlation coefficient between the temperature sensors in each group (step S5).

Following this, in the case where each correlation coefficient of temperature information calculated by the correlation coefficient calculator 131 is a predetermined value or more (e.g., 0.8 or more), the controller 13 determines that a group reset is unnecessary (step S6: NO). In the case where a correlation coefficient of temperature information regularly calculated by the correlation coefficient calculator 131 is less than the predetermined value, on the other hand, the controller 13 determines that a group reset is necessary (step S6: YES). In this case, the air-conditioning control apparatus 1 performs a group reset process (step S7). This completes the operation.

(Operation of Group Reset Process)

In the case where a correlation coefficient of temperature information calculated by the correlation coefficient calculator 131 is less than the predetermined value, the group reset process of step S7 in FIG. 10 is performed. FIG. 11 is a flowchart illustrating the group reset process in detail.

First, the group reset unit 134 calculates, for a temperature sensor corresponding to the correlation coefficient which is less than the predetermined value, the correlation coefficient between the temperature sensor and each of the other temperature sensors including the temperature sensors outside the group, using the correlation coefficient calculator 131 (step S701).

The group reset unit 134 then determines whether or not there is a combination whose correlation coefficient is greater than or equal to the predetermined value (step S702). In the case where there is a combination whose correlation coefficient is greater than or equal to the predetermined value (step S702: YES), the group reset unit 134 changes the temperature sensor to the same group as the group to which the other temperature sensor in the combination whose correlation coefficient is greater than or equal to the predetermined value belongs (step S703). After this, the notification unit 135 notifies the administrator that the group to which the temperature sensor belongs has been changed, by email or the like (step S704). This completes the operation.

In the case where there is no combination whose correlation coefficient is greater than or equal to the predetermined value (step S702: NO), the group reset unit 134 changes the temperature sensor such that it no longer belongs to any group (step S705). After this, the notification unit 135 notifies the administrator that the temperature sensor has been changed such that it no longer belongs to any group, by email or the like (step S706). This completes the operation.

Thus, in the air-conditioning control system according to this embodiment, the temperature sensors are grouped based on correlation coefficients, and the air conditioners are controlled on a group-by-group basis. In the case where a temperature sensor has been moved, the groups are reset based on correlation coefficients. This enables adaptive control of the air conditioners even when any of the temperature sensors have been moved. In other words, this avoids the acquisition of environmental information which is different from that of the location for which environmental information was to be acquired. Moreover, there is no risk of degrading the environment of the area to which the temperature sensor has been moved. Furthermore, the location of the moved environmental sensor can be determined easily.

In the air-conditioning control system according to this embodiment, the correlation coefficient between the temperature information of the temperature sensors in each group is calculated in step S5, without calculating the correlation coefficients between all temperature sensors on the floor. This reduces the processing load on the air-conditioning control apparatus 1 in the regular operation.

In the air-conditioning control system according to this embodiment, the change of the group to which the temperature sensor belongs is notified. This makes it possible to estimate where the temperature sensor has been moved to, and facilitates determination of the location of the moved temperature sensor.

Although the embodiment describes an example where the group generator 132 groups the environmental sensors based only on correlation coefficients, this is not a limitation. The group generator 132 may group the environmental sensors based on correlation coefficients and temperature differences. In detail, in the case where the correlation coefficient between temperature sensors is greater than or equal to a predetermined value and the temperature difference in average between the temperatures acquired by the temperature sensors is less than a predetermined temperature, the group generator 132 may put the temperature sensors into the same group. Since temperature sensors that are strongly correlated but have a temperature difference greater than or equal to a predetermined temperature are not put into the same group, it is possible to put only the more closely correlated temperature sensors into the same group. Based on the temperature information acquired by the temperature sensors in each group, the air-conditioning control apparatus 1 controls each air conditioner associated with the group. More appropriate control can thus be achieved.

Although the embodiment describes an example where the group reset unit 134 performs the group reset process based only on correlation coefficients, this is not a limitation. The group reset unit 134 may reset the environmental sensors based on correlation coefficients and temperature differences. In detail, in the case where the correlation coefficient between temperature sensors is greater than or equal to a predetermined value and the temperature difference in average between the temperatures acquired by the temperature sensors is less than a predetermined temperature, the group generator 132 may change the group. Since temperature sensors that are strongly correlated but have a temperature difference greater than or equal to a predetermined temperature are not put into the same group, it is possible to put only the more closely correlated temperature sensors into the same group. Based on the temperature information acquired by the temperature sensors in each group, the air-conditioning control apparatus 1 controls each air conditioner associated with the group. More appropriate control can thus be achieved.

Moreover, in the case where the temperature acquired by a temperature sensor in the group is unchanged after a predetermined time has passed from the start of controlling the air conditioners associated with each group, the group reset unit 134 may perform a group reset only for the temperature sensor having no temperature change. In the examples shown in FIGS. 4 and 7 according to the present embodiment, the number of temperature sensors belonging to each group is two in the initial state. In such a case, this determination is performed to omit the group reset process for the temperature sensor (the temperature sensor 2b in the example in FIG. 7) for which no group change is necessary. This determination need not be performed in the case where the number of temperature sensors belonging to each group is three or more.

Although the embodiment describes an example where the group reset unit 134 calculates the correlation coefficient between the temperature sensor and each of the other temperature sensors including the temperature sensors outside the group using the correlation coefficient calculator 131 and, if there is a combination whose correlation coefficient is a predetermined value or more, changes the temperature sensor to the same group as the group to which the other temperature sensor in the combination whose correlation coefficient is the predetermined value or more belongs, this is not a limitation. For example, the group reset unit 134 may change the temperature sensor to the same group as the group to which a temperature sensor having the highest correlation coefficient with the temperature sensor belongs. The group reset unit 134 may perform a group reset process that results in the temperature sensor belonging to the same group as before the reset. The group reset unit 134 may calculate the correlation coefficient between the temperature information acquired by the temperature sensor in one day and the temperature information acquired by the same temperature sensor in the previous day. The group reset unit 134 may perform no group change in the case where the correlation coefficient is a predetermined value or more, and change the group in the case where the correlation coefficient is less than the predetermined value.

In the case where the values of the temperature sensors $2a$ to $2f$ do not follow air-conditioning control, air-conditioning control using the temperature sensors $2a$ to $2f$ may be canceled and switched to another control method. As an example, automatic control by the air conditioners may be performed. As another example, past (e.g., the previous day) control under the same conditions may be performed. As another example, the same control as that of neighboring air conditioners may be performed.

The temperature sensors $2a$ to $2f$ may each include a pressure sensor. The vertical movement of each of the temperature sensors $2a$ to $2f$ may then be detected based on the pressure detected by the temperature sensor. For example, an increase in pressure can be used to determine that the temperature sensor has dropped.

Although the embodiment describes an example where the air-conditioning control apparatus 1 communicates with each of the air conditioners $3a$ to $3f$ by the wireless communication unit 11 via the network N to control the air conditioner, this is not a limitation. The air-conditioning control apparatus 1 may include a wired communication interface, and utilize wired communication to control each of the air conditioners $3a$ to $3f$.

Although the embodiment describes an example where the environmental sensors are temperature sensors and the environmental information is temperature information, this is not a limitation. Any other types of environmental sensors and environmental information may be used. For example, the environmental sensors may be sensors for measuring environmental information such as humidity or carbon dioxide concentration, and the environmental information may be humidity information, carbon dioxide concentration information, or the like. The air conditioners to be controlled may be, for example, ventilating fans.

A computer may be suitably used to function as the air-conditioning control apparatus 1. In detail, the air-conditioning control apparatus 1 can be implemented by a central processing unit (CPU) of the computer reading and executing a program that is stored in a memory of the computer and in which the processes for achieving the functions of the air-conditioning control apparatus 1 are written.

While the disclosed system, apparatus, and method have been described by way of the drawings and embodiments, various changes or modifications may be easily made by those of ordinary skill in the art based on the disclosure. Such various changes or modifications are therefore included in the scope of the disclosure. For example, the functions included in the means, steps, etc. may be rearranged without logical inconsistency, and a plurality of means, steps, etc. may be combined into one means, step, etc. and a means, step, etc. may be divided into a plurality of means, steps, etc.

Many of the disclosed aspects are described in terms of sequences of operations performed by a computer system or other hardware capable of executing program instructions. Examples of the computer system or other hardware include a general-purpose computer, a personal computer (PC), a dedicated computer, a workstation, an electronic notepad, a laptop computer, and other programmable data processing apparatuses. In each embodiment, various operations are executed by dedicated circuitry (e.g., discrete logical gates interconnected to achieve specific functions) implemented by program instructions (software) or logical blocks, program modules, or the like executed by at least one processor. Examples of the at least one processor executing logical blocks, program modules, or the like include at least one microprocessor, central processing unit (CPU), application specific integrated circuit (ASIC), digital signal processor (DSP), programmable logic device (PLD), field programmable gate array (FPGA), controller, microcontroller, electronic device, other apparatuses designed to execute the functions described herein, and/or any combination thereof. The embodiments described herein are implemented, for example, by hardware, software, firmware, middleware, microcode, or any combination thereof.

Examples of the network used herein include, unless otherwise specified, the Internet, an ad hoc network, a local area network (LAN), other networks, or any combination thereof. The components of the wireless network include, for example, an access point (such as a Wi-Fi access point) and a femtocell.

The system is disclosed herein as having various modules and/or units for executing specific functions. These modules and units are schematically illustrated to simplify the description of its functionality, and do not necessarily represent specific hardware and/or software. In this regard, the modules, units, and other components may be hardware and/or software implemented to substantially execute the specific functions described herein. Various functions of different components may be any combination or separate ones of hardware and/or software, and may be used separately or in combination. Thus, the disclosed various aspects may be embodied in many different forms, and all such embodiments are within the scope of the disclosure.

REFERENCE SIGNS LIST

1 air-conditioning control apparatus
2a to 2f temperature sensor
3a to 3f air conditioner
4a to 4e store shelf
5a to 5e lighting
6 checkout counter
7a to 7c showcase
11 wireless communication unit
12 memory
13 controller
21a to 21f wireless communication unit
22a to 22f environmental information acquisition unit
131 correlation coefficient calculator
132 group generator
133 air conditioner controller
134 group reset unit
135 notification unit
N network

The invention claimed is:

1. An air-conditioning control system provided in an area and comprising an air-conditioning control apparatus configured to control a plurality of environmental sensors which acquire environmental information in the area and a plurality of air conditioners which air-condition the area, wherein the air-conditioning control apparatus is configured to:
　group the plurality of environmental sensors into a plurality of groups, based on correlation coefficients between environmental information acquired by the plurality of environmental sensors;
　regularly calculate a correlation coefficient between environmental information acquired by more than one environmental sensor in each of the plurality of groups;
　reset, in the case where the calculated correlation coefficient does not exceed a first threshold, a group associated with the more than one environmental sensor;
　associate each of the plurality of air conditioners with one of the plurality of groups based on the response time required for a temperature detected by each of the plurality of environmental sensors to exceed a second threshold in response to the operation of each of the plurality of air conditioners; and
　control an air conditioner in the plurality of air conditioners that is associated with any of the plurality of groups, based on environmental information acquired by each environmental sensor in the group associated with the air conditioner.

2. The air-conditioning control system according to claim 1, wherein a change of the group associated with the environmental sensor is notified.

3. The air-conditioning control system according to claim 1, wherein the environmental information is temperature, and environmental sensors corresponding to a correlation coefficient exceeding the first threshold and a temperature difference not exceeding a third threshold are put into a same group, based on correlation coefficients and temperature differences between temperatures acquired by the plurality of environmental sensors.

4. An air-conditioning control apparatus provided in an area to control a plurality of environmental sensors which acquire environmental information in the area and a plurality of air conditioners which air-condition the area based on the environmental information acquired by the plurality of environmental sensors, the air-conditioning control apparatus comprising:
　a group generator configured to group the plurality of environmental sensors into a plurality of groups, based on correlation coefficients between environmental information acquired by the plurality of environmental sensors;

a correlation coefficient calculator configured to regularly calculate a correlation coefficient between environmental information acquired by more than one environmental sensor in each of the plurality of groups;

a group reset unit configured to reset, in the case where the calculated correlation coefficient does not exceed a first threshold, a group associated with the more than one environmental sensor; and an air conditioner controller configured to
associate each of the plurality of air conditioners with one of the plurality of groups based on the response time required for a temperature detected by each of the plurality of environmental sensors to exceed a second threshold in response to the operation of each of the plurality of air conditioners, and control an air conditioner in the plurality of air conditioners that is associated with any of the plurality of groups, based on environmental information acquired by each environmental sensor in the group associated with the air conditioner.

5. The air-conditioning control apparatus according to claim 4, further comprising a notification unit configured to notify a change of the group associated with the environmental sensor.

6. The air-conditioning control apparatus according to claim 4, wherein the environmental information is a temperature, and environmental sensors corresponding to a correlation coefficient exceeding the first threshold and a temperature difference not exceeding a third threshold are put into a same group, based on correlation coefficients and temperature differences between temperatures acquired by the plurality of environmental sensors.

7. An air-conditioning control method used in an area to control a plurality of environmental sensors which acquire environmental information in the area and a plurality of air conditioners which air-condition the area, the air-conditioning control method including:

grouping the plurality of environmental sensors into a plurality of groups, based on correlation coefficients between environmental information acquired by the plurality of environmental sensors;

regularly calculating a correlation coefficient between environmental information acquired by more than one environmental sensor in each of the plurality of groups;

resetting, in the case where the calculated correlation coefficient does not exceed a first threshold, a group associated with the more than one environmental sensor;

associating each of the plurality of air conditioners with one of the plurality of groups based on the response time required for a temperature detected by each of the plurality of environmental sensors to exceed a second threshold in response to the operation of each of the plurality of air conditioners; and controlling an air conditioner in the plurality of air conditioners that is associated with any of the plurality of groups, based on environmental information acquired by each environmental sensor in the group associated with the air conditioner.

8. The air-conditioning control method according to claim 7, further including notifying a change of the group associated with the one or more environmental sensors caused by the resetting.

9. The air-conditioning control method according to claim 7, wherein the environmental information is temperature, and in the grouping, environmental sensors corresponding to a correlation coefficient exceeding the first threshold and a temperature difference not exceeding a third threshold are put into a same group, based on correlation coefficients and temperature differences between temperatures acquired by the plurality of environmental sensors.

10. The air-conditioning control method according to claim 7, wherein in the resetting, for an environmental sensor in a group corresponding to a correlation coefficient not exceeding the first threshold, a correlation coefficient between the environmental sensor and each of other environmental sensors including environmental sensors outside the group is calculated, and the environmental sensor is changed to a group to which another environmental sensor corresponding to a calculated correlation coefficient greater than or equal to a predetermined value belongs.

11. The air-conditioning control method according to claim 7, wherein in the resetting, for an environmental sensor in a group corresponding to a correlation coefficient not exceeding the first threshold, a correlation coefficient between the environmental sensor and each of other environmental sensors including environmental sensors outside the group is calculated, and the environmental sensor is changed such that it no longer belongs to any group in the case where each calculated correlation coefficient is not greater than or equal to a predetermined value.

* * * * *